(12) United States Patent
Mukhopadhyay et al.

(10) Patent No.: US 9,587,505 B2
(45) Date of Patent: *Mar. 7, 2017

(54) L BRUSH SEAL FOR TURBOMACHINERY APPLICATION

(71) Applicant: General Electric Company, Schenectady, NY (US)

(72) Inventors: Debabrata Mukhopadhyay, Karnataka (IN); Xiaoqing Zheng, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 560 days.

This patent is subject to a terminal disclaimer.

(21) Appl. No.: 14/097,753

(22) Filed: Dec. 5, 2013

(65) Prior Publication Data

US 2015/0159498 A1 Jun. 11, 2015

(51) Int. Cl.
*F01D 11/08* (2006.01)
*F16J 15/32* (2016.01)
*F01D 11/00* (2006.01)

(52) U.S. Cl.
CPC ............ *F01D 11/08* (2013.01); *F01D 11/001* (2013.01); *F16J 15/3288* (2013.01); *F05D 2240/56* (2013.01)

(58) Field of Classification Search
CPC ........ F01D 11/08; F01D 11/001; F01D 11/02; F05D 2240/56; F16J 15/3288
See application file for complete search history.

(56) References Cited

U.S. PATENT DOCUMENTS

| 5,201,530 | A | 4/1993 | Kelch et al. |
| 5,265,412 | A | 11/1993 | Bagepalli et al. |
| 5,335,920 | A | 8/1994 | Tseng et al. |
| 5,480,165 | A | 1/1996 | Flower |

(Continued)

FOREIGN PATENT DOCUMENTS

| EP | 0816726 | 1/1998 |
| EP | 2554879 | 4/2013 |

OTHER PUBLICATIONS

Search Report issued in GB Application No. 1304664.4, dated Jul. 19, 2013.

*Primary Examiner* — Igor Kershteyn
*Assistant Examiner* — Justin Seabe
(74) *Attorney, Agent, or Firm* — Nixon & Vanderhye PC

(57) ABSTRACT

A seal arrangement between radially-opposed rotating and stationary components in a turbomachine includes a first rotating component, a second stationary component, and a brush seal located radially therebetween. The brush seal has an axially-extending portion secured to the second stationary component, and an inwardly-extending portion extending across a gap between the first and second components. An inner ring portion of the second stationary component is located radially inward of, and in engagement with the axially-extending portion and at least part of the inwardly-extending portion of the brush seal, wherein an end of the axially-extending portion of the brush seal remote from the inwardly-extending portion is sandwiched between a pair of side rails fixed between the inner ring portion and an outer ring portion of the second stationary component.

14 Claims, 4 Drawing Sheets

(56) References Cited

U.S. PATENT DOCUMENTS

| | | | |
|---|---|---|---|
| 5,630,590 A * | 5/1997 | Bouchard | F01D 11/001 277/301 |
| 5,961,125 A | 10/1999 | Wolfe et al. | |
| 5,961,279 A | 10/1999 | Ingistov | |
| 6,053,699 A | 4/2000 | Turnquist et al. | |
| 6,059,526 A | 5/2000 | Mayr | |
| 6,077,038 A | 6/2000 | Gail et al. | |
| 6,079,714 A | 6/2000 | Kemsley | |
| 6,105,966 A | 8/2000 | Turnquist et al. | |
| 6,131,910 A | 10/2000 | Bagepalli et al. | |
| 6,173,962 B1 | 1/2001 | Morrison et al. | |
| 6,206,629 B1 | 3/2001 | Reluzco et al. | |
| 6,299,824 B1 | 10/2001 | Mayr et al. | |
| 6,308,957 B1 | 10/2001 | Wright | |
| 6,318,728 B1 * | 11/2001 | Addis | F01D 11/001 277/355 |
| 6,352,263 B1 | 3/2002 | Gail et al. | |
| 6,402,157 B1 | 6/2002 | Zhou et al. | |
| 6,428,009 B2 | 8/2002 | Justak | |
| 6,457,719 B1 | 10/2002 | Fellenstein et al. | |
| 6,460,857 B1 * | 10/2002 | Turnquist | F16J 15/3288 277/355 |
| 6,464,230 B1 | 10/2002 | Tong et al. | |
| 6,644,667 B2 * | 11/2003 | Grondahl | F16J 15/3292 277/303 |
| 6,648,334 B2 | 11/2003 | Inoue | |
| 6,681,486 B2 | 1/2004 | Flower | |
| 6,695,314 B1 * | 2/2004 | Gail | F01D 11/001 277/355 |
| 6,739,592 B2 * | 5/2004 | Kono | F16J 15/3288 277/355 |
| 6,764,078 B2 | 7/2004 | Inoue | |
| 6,951,339 B2 | 10/2005 | Turnquist et al. | |
| 7,032,903 B1 | 4/2006 | Dalton et al. | |
| 7,059,827 B1 | 6/2006 | Ingistov | |
| 7,445,212 B2 | 11/2008 | Gail et al. | |
| 7,516,962 B2 | 4/2009 | Boeck | |
| 7,559,554 B2 | 7/2009 | Hogg et al. | |
| 7,854,584 B2 | 12/2010 | Lusted et al. | |
| 8,075,254 B2 | 12/2011 | Morgan et al. | |
| 8,181,965 B2 | 5/2012 | Addis | |
| 8,235,392 B2 | 8/2012 | Gail et al. | |
| 8,328,198 B2 | 12/2012 | Adis et al. | |
| 8,596,973 B2 * | 12/2013 | Grondahl | F01D 11/003 415/231 |
| 2001/0030397 A1 | 10/2001 | Beichl | |
| 2004/0217549 A1 | 11/2004 | Justak | |
| 2005/0017458 A1 | 1/2005 | Turnquist et al. | |
| 2005/0151324 A1 | 7/2005 | Plona et al. | |
| 2006/0055118 A1 | 3/2006 | Beichl | |
| 2007/0114727 A1 | 5/2007 | Greif et al. | |
| 2007/0257445 A1 | 11/2007 | Mortzheim et al. | |
| 2008/0296846 A1 | 12/2008 | Daggett et al. | |
| 2010/0068042 A1 | 3/2010 | Bruck et al. | |
| 2010/0078893 A1 | 4/2010 | Turnquist et al. | |
| 2010/0201073 A1 | 8/2010 | Adis et al. | |
| 2010/0270747 A1 | 10/2010 | Ghasripoor et al. | |
| 2011/0156359 A1 | 6/2011 | Zheng et al. | |
| 2011/0204573 A1 | 8/2011 | Zheng et al. | |
| 2011/0272891 A1 | 11/2011 | Adis et al. | |
| 2011/0285090 A1 | 11/2011 | Zheng | |
| 2012/0086172 A1 | 4/2012 | Zheng et al. | |
| 2012/0177484 A1 | 7/2012 | Lusted et al. | |
| 2012/0195741 A1 | 8/2012 | Sarawate et al. | |
| 2012/0326392 A1 | 12/2012 | Zheng et al. | |
| 2012/0326393 A1 | 12/2012 | Zheng et al. | |
| 2013/0033008 A1 | 2/2013 | Martin et al. | |
| 2013/0256992 A1 | 10/2013 | Zheng et al. | |

* cited by examiner

L BRUSH SEAL FOR TURBOMACHINERY APPLICATION

This invention generally relates to seals employed in turbo machines, and more specifically to brush seals used, for example, in inter-stage root and tip sealing locations in steam turbines.

BACKGROUND OF THE INVENTION

While brush seals are often used in various turbo machinery applications to prevent or minimize leakage flows between rotating and stationary components, they cannot be used in many locations due to space constraints, seal stiffness and rotor stability, and in those locations, conventional J-seals with abradable or labyrinth seals are employed. Brush seals, however, are effective in that they allow less leakage flow across the seals. It would therefore be desirable to provide a brush seal configuration that can be installed in confined spaces between, for example, stator and rotor components of a turbo machine.

BRIEF DESCRIPTION OF THE INVENTION

In one exemplary but nonlimiting embodiment, the invention provides a seal arrangement between radially-opposed rotating and stationary components in a turbomachine comprising a first rotating component; a second stationary component; a brush seal located radially between the first rotating component and the second stationary component, the brush seal having an axially-extending portion secured the second stationary component, and an inwardly-extending portion extending across a gap between the first and second components; and an inner ring portion of the second stationary component ring located radially inward of, and in engagement with the axially-extending portion and at least part of the radially-extending portion of the brush seal.

In another exemplary but nonlimiting embodiment, the invention provides a seal arrangement between radially-opposed rotating and stationary components in a turbomachine comprising a first rotating component; a second stationary component; a brush seal located radially between the first rotating component and the second stationary component, the brush seal having an axially-extending portion secured to the second stationary component, and an inwardly-extending portion extending across a gap between the first and second components; an inner ring located radially inward of, and in engagement with the axially-extending portion and at least part of the inwardly-extending portion of the brush seal; wherein an end of the axially-extending portion of the brush seal remote from the inwardly-extending portion is sandwiched between a pair of side rails; wherein the pair of side rails is held between the inner ring and an outer ring, leaving an axially-extending radial gap between the axially-extending portion of the brush seal and the outer ring; and wherein the outer ring is provided with a hook flange adapted to be received in a complementary slot formed in an inner cover of a stationary turbine nozzle.

In still another exemplary but nonlimiting embodiment, the invention relates to a turbo machine having a flowpath comprising axially-spaced rows of buckets attached to a rotor, separated by stationary nozzles attached to a stator; and at least one brush seal arranged between the rotor and the stator, the brush seal having an axially-extending portion secured to the stator, and a substantially radially inwardly extending portion extending across a gap between the stator and the rotor; and a ring located radially inward of, and in engagement with the axially-extending portion of the brush seal and at least part of the substantially radially inwardly extending portion of the brush seal.

DETAILED DESCRIPTION OF THE INVENTION

Figure 1:
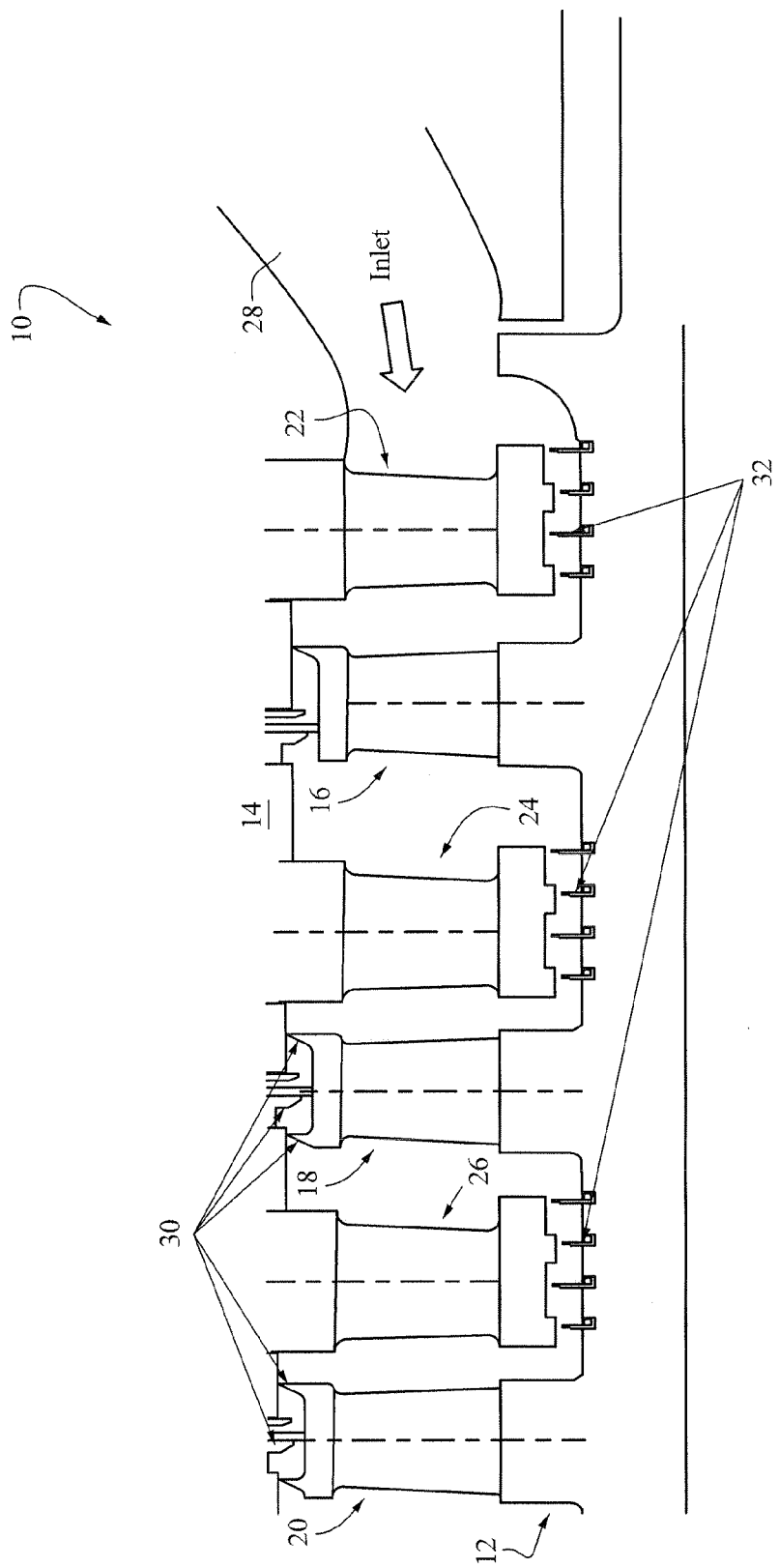
FIG. 1 is a schematic representation of a portion of a known steam turbine flowpath.

FIG. 1 illustrates a steam flowpath for a conventional steam turbine 10 that includes a rotor 12, a stator 14; and a plurality of turbine stages represented by axially-spaced rows of buckets 16, 18 and 20, respectively, fixed to the rotor 12. The turbine stages are separated by axially-spaced, stationary nozzles 22, 24 and 26, respectively. High-pressure steam enters the flowpath via an inlet 28 and thus, the flow of steam is from right to left as viewed in FIG. 1.

Typically, seals are employed at various locations between stationary and rotating components along the flowpath. For example, a plurality of tip seals 30 are mounted at the radially outer tip shrouds of the buckets 16, 18 and 20; or on the adjacent stator for interaction with the tip shrouds. In another location, a plurality of root seals 32 are mounted on the rotor 12, radially adjacent the inner ends of the nozzles 22, 24, 26. The root seals 32 may be so-called "J-seals" as shown that are designed to engage opposed strips or plates of abradable material on the adjacent nozzle surfaces in a well-known manner during operation. The tip seals 30 may be J-seals or conventional labyrinth seals. In any event, the seal locations referenced in FIG. 1 are also locations where brush seals as described below may be employed.

Figure 2:
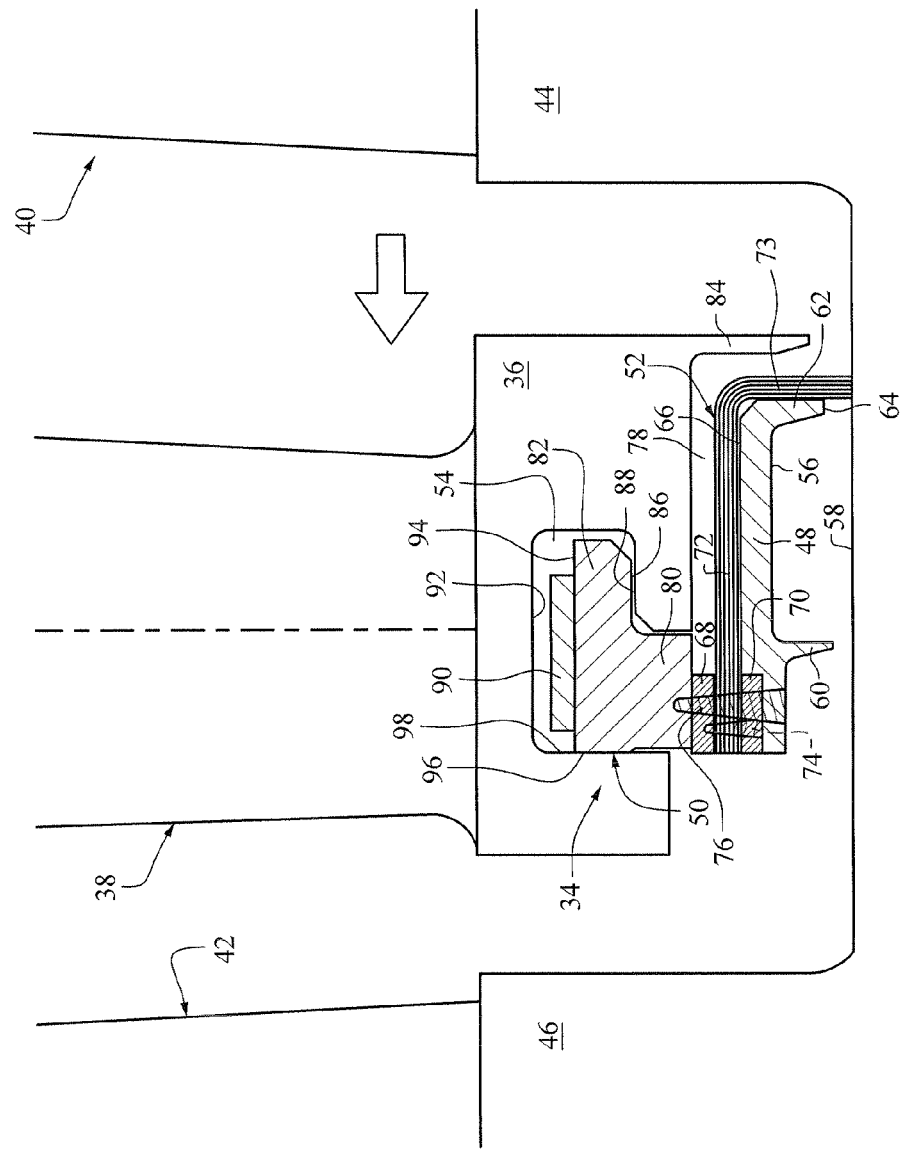
FIG. 2 is a partial section of a steam turbine flow path employing a seal in accordance with an exemplary but nonlimiting embodiment of the invention.

FIG. 2 illustrates a brush seal arrangement in accordance with a first exemplary but nonlimiting embodiment of the invention. Specifically, a brush seal assembly 34 is incorporated into an inner cover 36 of a stationary nozzle 38 located between rows of buckets 40, 42 on rotor wheels 44, 46, respectively.

The brush seal assembly 34 includes, generally, an inner ring 48, an outer ring 50 and a root L-brush seal 52 sandwiched therebetween. The outer ring (or hook) 50 is received within a complimentary slot 54 formed in the inner cover 36. It will be appreciated that the inner and outer rings (including the brush seal) are composed of one or more arcuate segments that form upper and lower 180° half-sections which, when installed with the turbine case, form a 360-degree ring structure surrounding the rotor 12.

The inner ring 48 is formed with an inner surface 56 that is substantially flat (in an axial direction) and that faces a flat (also in the axial direction) surface 58 of the rotor. The inner surface 56 may be provided with (or formed with) an optional seal tooth 60 located downstream of the brush seal to supplement the sealing afforded by the brush seal 52. The inner ring 48 is also provided with (or formed with) an inwardly-directed support tip 62, an inner edge 64 of which provides a stop limit for any radial outward excursion of the rotor due to thermal expansion, vibration and the like.

The outer surface 66 of the inner ring is also substantially flat in the axial direction, with accommodation for one (70) of a pair of plates 68, 70, between which one end of the bristle pack 72 of the brush seal 52 is secured. The other plate 68 is located radially between the bristle pack 72 and the outer ring 50. The assembly is fixed by, for example, Electron Beam (EB) welds 74, 76, which secure the one end of the bristle pack between the plates 68, 70 and which secure the inner ring 48 to the outer ring 46 (through the plates 68, 70 and the bristle pack 72), respectively. Alternatively, outer ring 50 and plate 68 could be an integral part. Similarly, inner ring 48 and plate 70 could be provided as an integral component.

The bristle pack 72 extends axially along, and is supported by, the outer surface 66 of the inner ring. At the end of the bristle pack remote from plates 68, 70, the bristle pack 72 bends through an angle of substantially 90 degrees and extends inwardly toward the surface 58 of the rotor. Both axially- and radially-extending portions may have a circumferential component. It will be seen that an axially-extending radial space 78 between the bristle pack 72 and the inner cover 36 (defined substantially by the thickness of the plate 68) provides ample room for flexure of the bristle pack as described further below. It will be appreciated that, while the inwardly-extending portion 73 of the bristle pack 72 is shown to extend substantially radially (or perpendicularly) to the rotor surface 58 (which is substantially parallel to the rotor axis), the inwardly extending portion 73 may also extend at various angles to the surface 58 and to the rotor axis.

The outer ring or hook 50 includes a narrowed radial neck portion 80 and an axially-extended hook portion 82 that retains the seal assembly within the correspondingly-shaped slot 54 provided in the inner cover 36 of the nozzle 38.

At the upstream end of the inner cover 36, a front plate 84 extends radially inwardly toward the rotor, but not to the full radial extent of the support tip 62, thus ensuring that the front plate 84 will not be engaged by the rotor under any operation condition. The front plate 84 provides protection to the upstream face of the bristle pack 72 from the high-pressure steam in that portion of the flowpath between the nozzle 38 and the row of buckets 40, but also leaves sufficient axial clearance to accommodate flexure of the bristle pack.

Because the two 180-degree halves of the brush seal assembly are archbound into a full cylinder (formed by the inner cover 36) when installed, the outer ring 60 is biased in a radially-outward direction and the surface 86 hook portion 82 of the outer ring 50 does not engage the opposed surface 88 of the slot 54. At the same time, a leaf or other suitable spring 90 extends circumferentially in the slot 54, engaged between an outer surface 92 of the slot and an outer surface 94 of the outer ring 50. The spring 90 biases the seal assembly in a radial-inward direction, together with pressure loading, thus the brush seal assembly becomes archbound and does not rely on the nozzle inner cover 36 to seal radially. Therefore, the seal is self-supported in the radial direction and is balanced within the slot 54 with a clearance maintained between surfaces 86 and 88. Thus, even though the leaf spring 90 will engage the outer ring at various locations about the circumference of the ring, the overall friction forces are reduced by effectively "floating" the seal assembly 34 within the slot 54 during operation. The leaf spring also dampens rotor vibrations absorbed through the brush seal assembly.

On the downstream side of the outer ring 50, an axially-projecting surface 96 will engage a facing surface 98 of the slot 54 during operation of the turbine. In other words, clearance between the outer ring 50 and the slot 54 permits the seal assembly to move axially within the slot under pressure exerted by the steam flowing from right-to-left as viewed in FIG. 2, thus creating a second seal at the interface of surfaces 96, 98.

The seal can be assembled to have a cold gap between the bristle pack and the rotor 44. During operation, the cold gap decreases as the turbine reaches its normal operating condition, such that the bristle pack 72 engages the rotor due to rotor growth, and bristles blowdown by pressure. In light of the above described arrangement, the bristle pack is free to flex away from the lip 62 and away from the surface 66 of the inner ring 48 once pressure loading is gone.

Figure 3:
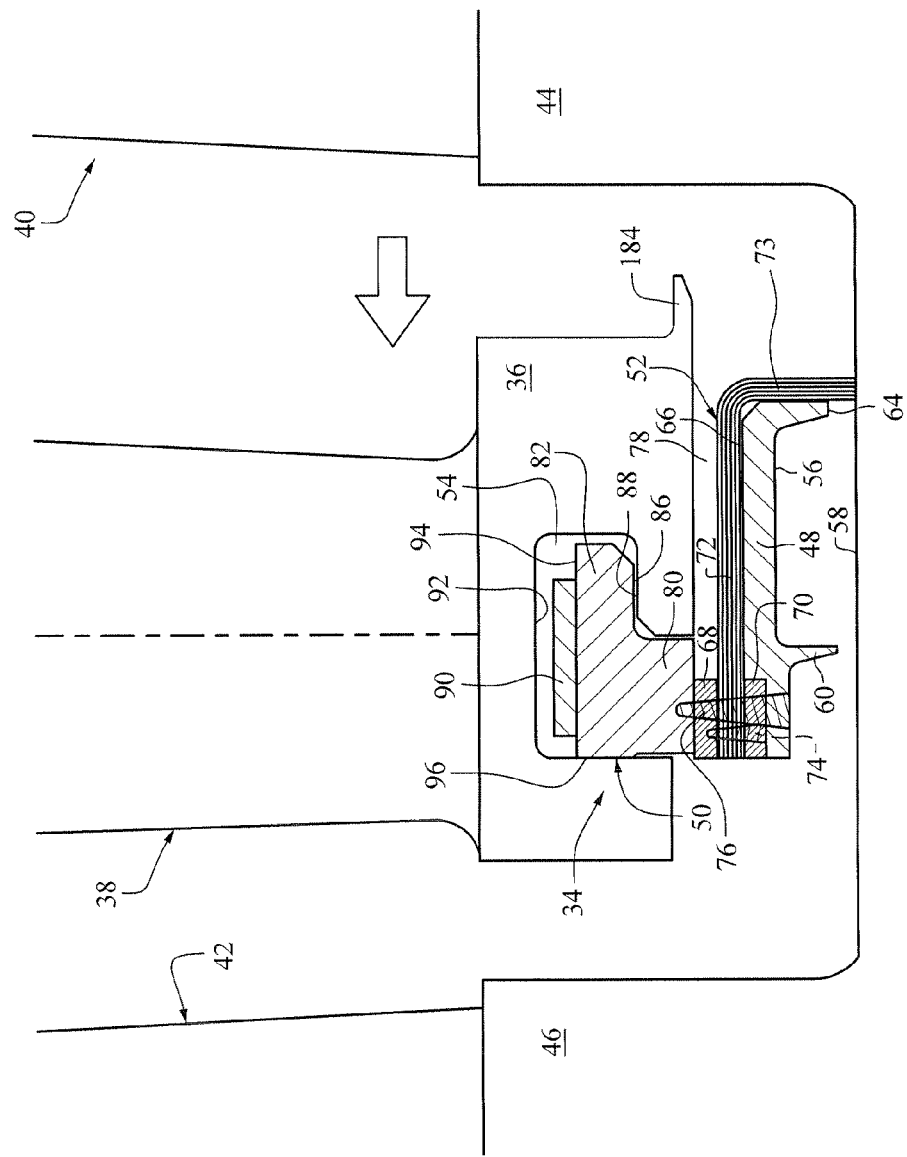
FIG. 3 is an enlarged detail of a variant of the seal arrangement shown in FIG. 2.

In an alternative arrangement illustrated in FIG. 3, the front plate 184 of the outer ring 50 extends only in an axial direction rather than in a radial direction as shown in FIG. 2, but still protects the distal end of the bristle pack 72 from high-pressure steam impingement. Otherwise, the configuration of the seal assembly is substantially identical to the arrangement in FIG. 2.

Figure 4:
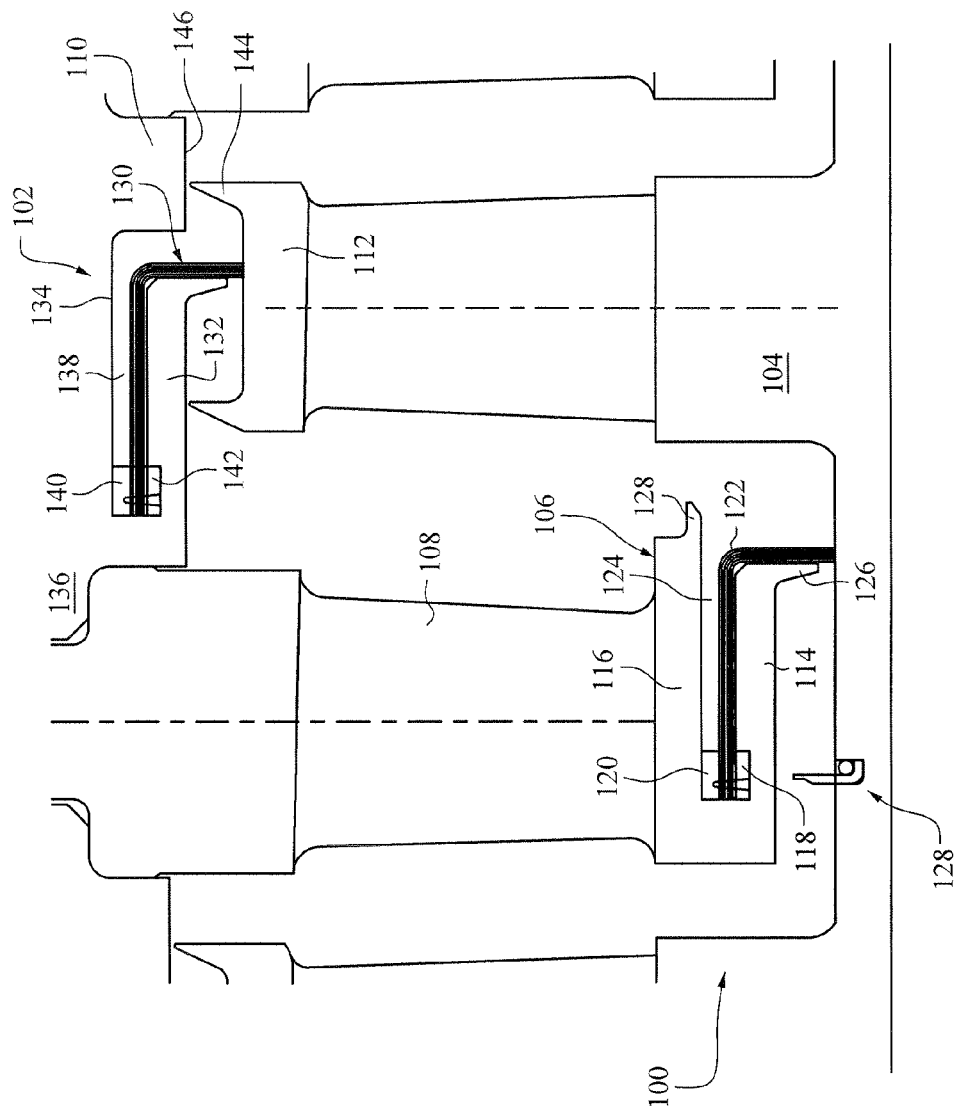
FIG. 4 is a partial section of a steam turbine flow path employing seals in accordance with other exemplary but nonlimiting embodiments of the invention.

Turning to FIG. 4, additional exemplary brush seal assemblies in accordance with the invention are illustrated. The brush seal assemblies 100, 102 are substantially as described above, but located between the rotor 10 and an inner cover 106 of a nozzle 108; and between a stationary outer band 110 and a bucket tip shroud 112, respectively.

Unlike the brush seal assembly shown in FIG. 2, the brush seal assembly 100 is incorporated directly into the inner cover 106. Specifically, inner and outer ring portions 114, 116 of are integrated with the cover 106, but the brush seal is secured between the inner and outer ring portions via side rails 118, 120 in much the same manner as described above. Thus, one end of the bristle pack 122 is sandwiched between the side rails via welds or other suitable means, and the side rails are fixed between the inner and outer ring portions 114, 116, via a tight fit or other suitable means, creating the axially-extending radial space 124 similar to space 78 in FIG. 2. A support tip 126 on the inner ring portion 114 is provided and is similar in structure and function to the support tip 62. As in the previously-described embodiment, the space 124 provides sufficient clearance for the bristle pack 122 to flex when engaged by the rotor. Note also that in this arrangement, the front plate 128 is similar to the front plate 184 in FIG. 3. FIG. 4 also shows an optional J-seal 128 downstream of the brush seal bristle pack 122, extending radially outwardly from the rotor 104.

The brush seal 102 is similarly configured, with the bristle pack 130 supported between inner and outer ring portions 132, 134 of the stationary stator 136. Stated otherwise, the bristle pack 130 is supported within a groove 138, and sandwiched between side rails 140, 142 which are, in turn, welded to the opposed surfaces defining the groove or slot 138. Note that in this case, the bristle pack 130 is also protected by the upstream seal portion 144 of the bucket tip shroud 112 and the opposed seal surface 146 of the stator 136.

In both the seal arrangements illustrated in FIG. 4, the brush seals are substantially rigidly secured to the nozzle inner cover 106 and stator 136 respectively, unlike the "floating" arrangement of FIG. 2. Nevertheless, the flexing action of the bristle pack and the protection features for the bristle pack are similar in all cases.

While in the exemplary embodiments described herein, the brush seal assemblies are secured to the stationary (or stator) components of the turbomachine, it will be understood that they could also be installed on the rotating (or rotor) components as well.

In addition, it will be understood that the bristle packs of the brush seals may be substantially radially-oriented or angled in a circumferential direction (i.e., in the direction of rotation of the rotor). In all cases, the brush seals accommodate radial expansion of the rotor due to heat, vibration, or other conditions and tend to spread the heat generated by contact with the rotor.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A seal arrangement between radially-opposed rotating and stationary components in a turbomachine comprising:
    a first rotating component;
    a second stationary component;
    a brush seal located radially between said first rotating component and said second stationary component, said brush seal having an axially-extending portion secured to said second stationary component, and an inwardly-extending portion extending across a gap between said first and second components, wherein an end of said axially-extending portion of said brush seal remote from said inwardly-extending portion is sandwiched between a pair of side rails; and
    an inner ring portion of said second stationary component located radially inward of, and in engagement with said axially-extending portion and at least part of said inwardly-extending portion of said brush seal, wherein said pair of side rails is held between said inner ring portion and an outer ring portion of said second stationary component, leaving an axially-extending radial gap between said axially-extending portion of said brush seal and said outer ring portion of said second stationary component.

2. The seal arrangement of claim 1, wherein said outer ring portion is provided with a radially inwardly directed front plate axially spaced from said inwardly-extending portion of said brush seal.

3. The seal arrangement of claim 1 wherein said inner ring portion is provided with a seal tooth downstream of said brush seal.

4. The seal arrangement of claim 1, wherein said outer ring portion is provided with a hook flange adapted to be received in a complementary slot formed in an inner cover of a stationary turbine nozzle.

5. The seal arrangement of claim 4 wherein a spring is located radially between a radially outer surface of said outer ring portion and an inwardly facing wall of said complementary slot.

6. The seal arrangement of claim 1, wherein said inner ring portion is attached to said outer ring portion through said side rails and said brush seal.

7. The seal arrangement of claim 6 wherein said inner ring portion is attached to said outer ring portion by means of welds extending through said inner ring portion, said brush seal and into said outer ring portion.

8. The seal arrangement of claim 1, wherein said outer ring portion is provided with a plate portion extending axially beyond said inwardly-extending portion of said brush seal.

9. The seal arrangement of claim 1, wherein said second stationary component comprises an inner cover of a turbine nozzle, said inner ring portion and said outer ring portion are integral parts of said inner cover and wherein said first rotary component comprises a turbine rotor.

10. The seal arrangement of claim 1, wherein said first rotating component comprises a turbine bucket tip shroud and said second stationary component comprises a stator surface opposed to said tip shroud.

11. A seal arrangement between radially-opposed rotating and stationary components in a turbomachine comprising:
    a first rotating component;
    a second stationary component;
    a brush seal located radially between said first rotating component and said second stationary component, said brush seal having an axially-extending portion secured to said second stationary component, and an inwardly-extending portion extending across a gap between said first and second components;
    an inner ring located radially inward of, and in engagement with said axially-extending portion and at least part of said inwardly-extending portion of said brush seal;
    wherein an end of said axially-extending portion of said brush seal remote from said inwardly-extending portion is sandwiched between a pair of side rails;
    wherein said pair of side rails is held between said inner ring and an outer ring, leaving an axially-extending radial gap between said axially-extending portion of said brush seal and said outer ring; and
    wherein said outer ring is provided with a hook flange adapted to be received in a complementary slot formed in an inner cover of a stationary turbine nozzle.

12. The seal arrangement of claim 11 wherein said outer ring is provided with a radially inwardly directed front plate axially spaced from said inwardly-extending portion of said brush seal.

13. The seal arrangement of claim 11 wherein said inner ring is attached to said outer ring through said side rails and said brush seal.

14. The seal arrangement of claim 13 wherein said inner ring is attached to said outer ring by means of welds extending through said inner ring, said brush seal and into said outer ring.

* * * * *